Patented May 4, 1954

2,677,668

UNITED STATES PATENT OFFICE 2,677,668

STABILIZATION OF REDUCED METAL CATALYST

Jacob Elston Ahlberg, Chicago, Ill., assignor to the United States of America as represented by the United States Atomic Energy Commission No Drawing. Application January 11, 1945, Serial No. 572,433

4 Claims. (Cl. 252—472)

This invention relates to the manufacture of catalysts and more particularly an improved method for stabilizing a finely divided, reduced metal catalyst with respect to atmospheric air. The catalysts produced by the method of the present invention have been found particularly useful in accelerating the exchange of deuterium between hydrogen and water although they may be used for catalyzing other isotope exchange reactions or chemical reactions as well.

Conventional processes for producing reduced metal catalysts are well known in the art. In one such process, a basic carbonate of a metal is prepared by precipitation of the carbonate from a solution of the metal salt and the precipitated carbonate is then subjected to the action of a reducing atmosphere at elevated temperatures to decompose the metal carbonate to produce a metal in such form that it is an active catalyst. The reduction may be effected by charging the metal carbonate in the form of small aggregates or pellets into a reduction unit to form a thick layer or bed and then passing a reducing gas such as hydrogen through the bed at the desired elevated temperature to decompose the carbonate, reduce the resulting oxide and thereby produce a finely divided metal. The metal catalyst has frequently been formed on a suitable base such as "kieselguhr" or an oxide of a different metal.

Finely divided, reduced metal catalysts prepared in accordance with the foregoing procedure are subject to the disadvantage that they are pyrophoric, i. e., when exposed to atmospheric air they tend to oxidize very rapidly. Such a rapid oxidation produces considerable heat and may heat the catalyst to excessively high temperatures. It is undesirable both because it makes the catalyst hazardous to handle and because it reduces or destroys the catalytic properties of the catalyst. Hence it is the usual practice to stabilize the catalyst with respect to atmospheric air following the reduction step. In accordance with one previously proposed process, stabilization is effected by flushing the reduction unit with nitrogen at the end of the reduction step and cooling the catalyst bed to approximately room temperature. A small quantity of oxygen is then introduced into the nitrogen atmosphere in contact with the catalyst bed and the oxygen concentration is gradually increased at a controlled rate until the catalyst is stabilized toward atmospheric air.

The purpose of such a process is to selectively oxidize the more active portions of the catalyst under conditions that are so controlled as to prevent excessive heating of the catalyst and consequent damage to the catalyst. However, it has been found that even when the admission of oxygen is carefully controlled there is still a tendency toward localized overheating or "hot spotting" in the catalyst bed. When such "hot spots" occur it is necessary that the addition of oxygen be interrupted until the "hot spot" has been cooled to the desired low temperature and thus frequent "hot spotting" not only damages portions of the catalyst but also substantially increases the time required for the stabilization process.

It is an object of the present invention to provide an improved method for stabilizing with respect to atmospheric air a finely divided, reduced metal catalyst.

It is another object of the invention to provide a method of stabilizing a reduced metal catalyst to produce a product which is more nearly uniform and has a higher average catalytic activity.

It is a further object of the invention to provide a method of stabilizing a reduced metal catalyst with respect to atmospheric air in a shorter period of time than has heretofore been possible.

It is still another object of the invention to provide a method of stabilizing a catalyst which reduces the frequency of occurrence and intensity of "hot spots" in the catalyst bed during stabilization.

Other objects of the invention will be in part obvious and in part pointed out hereinafter.

In one of its broader aspects the invention comprises exposing the catalyst bed after the reduction step to an atmosphere of carbon dioxide gas, introducing a small quantity of oxygen into the carbon dioxide atmosphere, and increasing the oxygen concentration of carbon dioxide atmosphere over a period of time and at a rate that is sufficiently slow to prevent undesirable overheating of the catalyst bed. I have found that by substituting carbon dioxide for nitrogen in the stabilization process described above, the frequency of occurrence of "hot spots" in the catalyst bed may be materially reduced and the temperature of the bed more accurately controlled thus producing a catalyst having a higher average catalytic activity and reducing the time required for stabilization.

Considering a somewhat narrower aspect of the present invention, the catalyst to be stabilized may be prepared as follows: A mixed basic carbonate of nickel and chromium is precipitated from a solution containing a mixture of nickel and chromium nitrates. The basic carbonate is then filtered and roasted to decompose the carbonate and produce a mixture of nickel and chromium oxides, following which the mixed oxides are subjected to a reducing atmosphere at an elevated temperature under such conditions that the nickel oxide is reduced to metallic nickel but the chromium oxide is not reduced. Upon completion of the reduction step the reduction unit containing the resulting nickel-chromia catalyst is flushed with nitrogen and cooled to approximately room temperature. When the catalyst bed has been cooled the nitrogen atmosphere is replaced by carbon dioxide. The replacement of the nitrogen by carbon dioxide can be conveniently carried out by continuously circulating the nitrogen through the catalyst bed and adding carbon dioxide to the circulating nitrogen while continuously venting the circulating gas until the nitrogen concentration has been reduced to the desired value.

During introduction of the carbon dioxide some increase in temperature occurs but this rise in temperature is not sufficient to injure the catalyst. When the nitrogen has been substantially completely replaced by carbon dioxide a small quantity of oxygen, say a tenth of one per cent by volume, is introduced into the circulating carbon dioxide and thereafter oxygen is added at a relatively slow controlled rate until the catalyst is substantially stabilized. Under such circumstances it is found that stabilization can be effected in approximately 16 to 20 hours as compared with 40 to 60 hours where a nitrogen atmosphere is used. Furthermore, there is considerably less tendency for the catalyst bed to "hot spot" when using carbon dioxide.

Although I do not wish to be bound by any particular theory of the operation of the present process, the following discussion gives my present understanding of the reasons for the improved results obtainable by using the process. It is probable that "hot spotting" is caused in large measure by oxidation of hydrogen that is adsorbed on the surface of the finely divided metal catalyst. There is evidence to indicate that carbon dioxide is strongly adsorbed on such catalyst surfaces. Since such adsorption processes are normally exothermic the slight rise in temperature that occurs when carbon dioxide is brought into contact with the catalyst suggests that adsorption of the carbon dioxide takes place. When the catalyst bed starts to overheat locally the carbon dioxide on the catalyst surfaces is desorbed. Desorption of the carbon dioxide is endothermic and therefore such desorption cushions the temperature rise and tends to prevent excessive heating.

In order to point out more fully the nature of the present invention the following specific example is given to illustrate a preferred embodiment of the method of the invention. A solution containing 1.5 pounds of nickel nitrate ($Ni(NO_3)_2.6H_2O$) and 0.0278 pound of chromium nitrate ($Cr(NO_3)_3.9(H_2O)$) per gallon of solution was added to a strongly agitated solution containing 0.75 pound of sodium carbonate ($Na_2CO_3$) per gallon to cause a precipitate of basic nickel and chromium carbonates to be formed. The nitrate solution was added to the carbonate solution until the pH of the resulting slurry was 7.0 to 7.4. The precipitate was filtered, washed free from soluble matter and partially dried by heating at 60° C. to 70° C. The dried product consisting of a mixture of the basic carbonates of nickel and chromium was broken up into lump form and charged into a rotary kiln wherein it was heated to a temperature of about 650° F. to decompose the carbonates and form a mixture of nickel and chromium oxides.

After completion of the roasting step as described above the volatile content of the resulting oxide mixture was about 4 to 10%. The oxides were then ground, mixed with a small amount of graphite and formed into pellets or pills in the form of cylinders approximately ⅛" in diameter by ⅛" long. The pellets were charged into a reduction furnace provided with a circulating system for circulating gas through the catalyst bed in the furnace. The furnace was initially purged with nitrogen gas to eliminate air and the hydrogen was fed into the circulating system to replace the nitrogen. The nitrogen was continuously vented from the system until the hydrogen had been built up to the desired concentration, and the reduction was then carried out at a temperature of about 625° F. The extent to which the reduction had proceeded was determined by condensing out of the circulating gas the water formed in the reduction reaction and measuring the condensate to determine when the reaction was complete.

Upon completion of the reduction step nitrogen was introduced into the circulating system and hydrogen vented continuously to cause the nitrogen to replace the hydrogen in the circulating system. At the same time the bed was cooled to a temperature of 60° F. to 70° F. Carbon dioxide was then introduced into the circulating gas to replace the nitrogen and the nitrogen vented until its concentration was less than about 1% by volume. During introduction of the carbon dioxide there was a slight tendency for the catalyst bed to heat up but it was found that this heat could be readily dissipated without raising the temperature of the bed more than a few degrees.

When the desired concentration of carbon dioxide had been built up, elementary oxygen was admitted to the circulating system in an amount sufficient to produce an oxygen concentration about 0.1% by volume and the gas circulated through the catalyst bed. The bed was provided with a large number of thermocouples to permit observation of temperatures throughout the bed so that "hot spots" could be rapidly and effectively detected. Circulation of the carbon dioxide containing 0.1% oxygen was continued until temperature conditions within the bed were stabilized at about room temperature. The oxygen concentration of the circulating gas was then increased in steps by further additions of elementary oxygen and the gas circulated after each oxygen addition until stable temperature conditions were again obtained within the bed. When the bed had become stabilized to oxygen concentrations of about 3%, the catalyst was warmed up to 90 to 95° F. and atmospheric air was continuously introduced into the circulating gas and the gas continuously vented to cause the air to replace the carbon dioxide. The air was added at a relatively slow rate, i. e. at such a rate as to require about 6 hours for complete replacement of the carbon dioxide by the air. At the end of this period it was found that the catalyst was completely stabilized to atmospheric air and could be stored or packaged as desired without danger of spontaneous overheating.

It will be recognized by those skilled in the art that it is not possible to give a precise stabilization schedule. The table given below sets forth the recommended minimum times for circulation of the gas at each of several oxygen concentrations.

| Percent oxygen | Minimum time in hours |
|---|---|
| 0.1 | 1 |
| 0.25 | 3 |
| 0.5 | 1 |
| 0.75 | 1 |
| 1.0 | 1 |
| 1.5 | ½ |
| 2.0 | ½ |
| 3.0 | ¼ |

It is to be understood that the minimum times set forth in the above table are not absolute minima, that is, in particular cases it may be desirable to use somewhat shorter periods of time. Furthermore the period for circulation at any given concentration may be substantially greater than that given in the table in cases where persistent "hot spotting" occurs. However, the minimum times given should usually be observed because of the fact that a certain amount of time may be required to initiate the oxidation reaction at any given concentration of oxygen.

It is not possible to state categorically the maximum temperature to which the catalyst may be safely heated without unduly impairing its activity. Different batches of catalyst prepared in accordance with the above illustrative procedure vary somewhat in their activity and also in their resistance to the effect of elevated temperatures. Furthermore it will be apparent to those skilled in the art that the above procedure for producing the catalyst may be varied and modified and such variations and modifications will produce variations in the activity of the catalyst. However it has been found, in general, that the temperature of the catalyst bed should desirably be maintained below about 125° F. in most cases and that the rate of addition of oxygen or air should be so controlled as to maintain the temperature of all parts of the bed below this value. If desired, the stabilization can be carried out at two or more different temperatures as disclosed in my copending application Serial No. 572,434, filed January 11, 1945.

From the above description it is apparent that the present invention provides an improved method of stabilizing a reduced metal catalyst to produce a product having a relatively high average activity. By using a carbon dioxide atmosphere the intensity and frequency of occurrence of "hot spots" may be reduced and thus the temperature of the catalyst bed may be more easily kept within the desired range so that the activity of the catalyst will be maintained at a high value. Furthermore the stabilization process may be carried out more rapidly when a carbon dioxide atmosphere is used.

Although the method of the invention has been illustratively described as applied to a nickel catalyst supported on chromia, it is evident that the method may equally well be applied to the stabilization of other finely divided, metal catalysts on other substrata. Thus the method may be usefully applied in the stabilization of cobalt, copper or other similar metal catalysts and in the case of catalysts supported on kieselguhr, alumina or the like.

Since many embodiments might be made of the above-described invention and since many changes might be made in the embodiment described, it is to be understood that the foregoing description is to be interpreted as illustrative only and not in a limiting sense.

I claim:

1. The method of stabilizing with respect to atmospheric air a finely divided, pyrophoric metal catalyst formed by reduction of a compound of said metal, which comprises exposing said catalyst after reduction to an atmosphere of carbon dioxide at about room temperature, introducing into said atmosphere approximately 0.1% by volume of oxygen, adding oxygen to said atmosphere over a period of time until said catalyst is stable to atmospheric air, and interrupting the addition of oxygen to said atmosphere periodically to prevent the temperature of said catalyst from rising above about 125° F.

2. The method of stabilizing with respect to atmospheric air a finely divided, nickel catalyst formed by reduction of a nickel compound, which comprises exposing said catalyst after reduction to an atmosphere of carbon dioxide at about room temperature, introducing into said atmosphere a small quantity of oxygen, and increasing the oxygen concentration in said atmosphere over a period of time and at a rate that is sufficiently slow to prevent heating of said catalyst above about 125° F. until said catalyst is stable to atmospheric air.

3. The method of stabilizing with respect to atmospheric air a finely divided, nickel catalyst formed by reduction of a nickel compound, which comprises exposing said catalyst after reduction to an atmosphere of carbon dioxide at about room temperature, introducing into said atmosphere approximately 0.1% by volume of oxygen, adding oxygen to said atmosphere over a period of time until said catalyst is stable to atmospheric air, and interrupting the addition of oxygen to said atmosphere periodically to prevent the temperature of said catalyst from rising about 125° F.

4. The method of stabilizing with respect to atmospheric air a finely divided, nickel catalyst formed by reduction of a nickel compound, which comprises exposing said catalyst after reduction to an atmosphere of carbon dioxide at about room temperature, introducing into said atmosphere approximately 0.1% by volume of elementary oxygen, adding elementary oxygen to said atmosphere at a rate that is sufficiently slow to prevent undesired overheating of said catalyst until the oxygen concentration of said atmosphere is about 2%, and gradually replacing said carbon dioxide with atmospheric air.

References Cited in the file of this patent

UNITED STATES PATENTS

| Number | Name | Date |
|---|---|---|
| 1,093,377 | Boberg | Apr. 14, 1914 |
| 1,299,004 | Morrison | Apr. 1, 1919 |
| 2,112,643 | Baensch et al. | Mar. 29, 1938 |
| 2,274,988 | Matuszak | Mar. 3, 1942 |

References Cited in the file of this patent

UNITED STATES PATENTS

| Number | Name | Date |
|---|---|---|
| 171,976 | Great Britain | Oct. 4, 1921 |